(12) United States Patent
Bryant

(10) Patent No.: US 6,951,619 B2
(45) Date of Patent: Oct. 4, 2005

(54) APPARATUS FOR TRAPPING FLOATING AND NON-FLOATING PARTICULATE MATTER

(76) Inventor: Graham Bryant, 129 Linden Ave., Westfield, NJ (US) 07090

(*) Notice: Subject to any disclaimer, the term of this patent is extended or adjusted under 35 U.S.C. 154(b) by 2 days.

(21) Appl. No.: 10/646,431

(22) Filed: Aug. 22, 2003

(65) Prior Publication Data
US 2005/0040118 A1 Feb. 24, 2005

(51) Int. Cl.[7] .......................... C02F 1/38; B01D 21/26
(52) U.S. Cl. .................. 210/788; 210/787; 210/800; 210/802; 210/512.1; 210/519; 210/521; 210/532.1; 210/538
(58) Field of Search .................. 210/788, 800, 210/512.1, 519, 521, 532.1, 538, 787, 802

(56) References Cited

U.S. PATENT DOCUMENTS 5,759,415 A * 6/1998 Adams .................. 210/532.1

FOREIGN PATENT DOCUMENTS

WO   WO 00/06288   * 10/2000

* cited by examiner

Primary Examiner—David A. Reifsnyder
(74) Attorney, Agent, or Firm—Klauber & Jackson

(57) ABSTRACT

A separation tank with an outer chamber and an inner chamber within the outer chamber. An inlet and outlet are formed in the outer chamber to receive and discharge water, respectively. An inlet opening is located in the inner chamber and is generally aligned with the inlet to receive water from the inlet. An outlet opening is formed in the inner chamber below the inlet opening but above the bottom of the inner chamber. The inner chamber has a cylindrical interior surface such that water from the inlet is directed at a tangent to the interior surface and forms a vortex as the water progresses through the inner chamber. A baffle plate having an opening forming upper and lower weirs is located within the outer chamber just upstream of the outlet to separate both floatable and non-floatable material from the water prior to its discharge.

27 Claims, 2 Drawing Sheets

APPARATUS FOR TRAPPING FLOATING AND NON-FLOATING PARTICULATE MATTER

TECHNICAL FIELD

The present invention relates generally to a device for trapping particulate matter in a liquid piping system. More specifically, the present invention relates to a device for trapping both floating and non-floating particulate matter flowing through a storm water sewer system.

BACKGROUND OF THE INVENTION

In the treatment of storm water, it is necessary to remove various undesirable elements and components, such as bacteria, oil, metals, nutrients, trash and a number of other solids. Many of the pollutants bond to the finer sediment and which is the reason many regulatory agencies now focus on total suspended solids (TSS) as a criteria for design/approval of stormwater quality measures.

To that end, the Clean Water Act requires some stormwater quality treatment for all new developments over 0.5 acres in size. Many types of equipment and processes have been suggested for dealing with this problem.

One of the difficulties in the removal of such materials from stormwater is the need to take into account different flows of that water. For example, under normal conditions, there may be a steady, relatively low flow of water that passes through the treatment facility, while at other times, there is a heavy storm and the flow rapidly turns into a high flow and, therefore, the stormwater treatment facility needs to also be able to handle that high flow of water to be treated.

The devices need to be capable of trapping both floating and non-floating debris under both flow conditions efficiently and at a low cost of the equipment.

One of the problems in dealing with both high and low flows is that the debris and other material may be effectively removed and settled in the particular stormwater equipment at the low flow conditions, however, when the flow is then elevated to a high flow condition, that high flow effectively scours out the previously settled material and then is carried downstream, thereby reducing or eliminating the effectiveness of the stormwater treatment device.

As a further problem in dealing with the differing flows, the high flow streams of water carry additional trash and larger solids that are only picked up and carried along by the higher flows and therefore there is a need to be able to capture that trash and larger solids with the stormwater treatment device.

Accordingly, there have been various stormwater treatment devices that provide for the separate treatment of the high flows and the low flows, and one typical manner of such treatment is to separate the high flow streams of water from the low flow streams in the water treatment device such that the high flows can be dealt with in a separate area that can effectively deal with those additional larger solids and trash while also preventing those high flow streams of water from scouring out the material that has been removed and therefore settled in the low flow treatment areas of the stormwater treatment device.

One of such stormwater treatment devices is shown and described in my co-pending U.S. patent application Ser. No. 10/247,875, filed Sep. 20, 2002, and entitled APPARATUS FOR TRAPPING FLOATING AND NON-FLOATING PARTICULATE MATTER and the disclosure of that patent application is hereby incorporated herein in its entirety by reference. In the stormwater treatment device of that patent application, however, the incoming stream of water to be treated enters an inner chamber in a direction that is perpendicular to the wall of the inner chamber and the water thereby directly hits the wall of the inner chamber where turbulence is created during both high and low flow conditions.

Additionally, the high and low flows are split in two directions but converge at the outlet where, again, turbulence occurs. Certainly, it would be preferable for the water treatment device to have the various streams of water pass smoothly through the treatment device and not be subjected to turbulence.

As a further difficulty with the stormwater treatment device of the aforesaid patent application, the device requires the installation of two sets of weirs, that is, two high and two low weirs in carrying out the treatment of the water flowing therethrough and those weirs must be installed in the field during the installation of the treatment device at the intended site. That use of two sets of weirs, however, along with the centralized location of the inner chamber, offers limited space within the overall water separation device by the use of the multiple weirs and is insufficient to allow a worker to enter the device to carry out that installation.

Thus, there is a desire for an efficient and cost effective means for trapping debris in storm water that overcomes the difficulties of the aforedescribed stormwater treatment devices and yet which is effective at trapping both floating and non-floating particulate matter. Such an apparatus should be simple in its design and be able to be produced at low cost. The device should be flexible in varying field conditions, i.e., able to satisfy varying size and height requirements and be able to connect efficiently to the non-linear junction points that inevitably occur in piping systems. Finally, such a device should be easy to maintain and not be prone to clogging or need the regular changing of filtering materials.

SUMMARY OF THE INVENTION

It is an object of the present invention to provide a stormwater separation tank that can remove floating and non-floating particulate matter from storm water in a cost effective and efficient manner. In the invention, the separation tank may include an outer chamber and an inner chamber positioned within the outer chamber. Preferably, the inner chamber is a generally cylindrical construction comprised of a cylindrical wall having an interior cylindrical surface. An inlet is provided in the outer chamber to receive the flow of water to be treated and an outlet is provided in the outer chamber to discharge that water after it has been treated in the stormwater separation tank.

An inlet opening is formed in the inner chamber and that inlet opening is located so as to be generally in vertical alignment with the inlet in the outer chamber such the flowing water that enters the inlet in the outer chamber can proceed into the inner chamber through the inlet opening in the inner chamber.

There is also an outlet opening formed in the inner chamber that is located vertically below the inlet opening in the inner chamber. The inlet opening and the outlet opening in the inner chamber are preferably rectangular openings.

The separation tank includes a baffle plate that is affixed to the interior surface of the outer chamber. The baffle plate has an opening formed therein that is preferably rectangular and which is located at a predetermined vertical location with respect to the separation tank and with respect to the inlet and outlet in the outer chamber and the inlet opening and outlet openings in the inner chamber. The baffle opening thus forms an upper weir and a lower weir for treatment of the water within the separation tank. The baffle plate is positioned within the outer chamber so as to isolate the outlet in that outer chamber such that all of the water that passes through the separation tank passes through the opening in the baffle plate to reach the outlet and thus, to be discharged from the separation tank.

The separation tank may further include a floor, and the inner chamber and the outer chamber may be positioned on the floor. The outer chamber may also be a cylinder having a cylindrical interior surface. The inlet, the inlet opening in the inner chamber and the outlet are positioned in a first vertical position range, and the outlet opening of the inner chamber is positioned in a second vertical position range, with the first vertical position range being higher than the second vertical position range.

The inner chamber is located in a particular position within the outer chamber such that it is not centered with respect to that outer chamber but is positioned off center and may have its wall touching or in close proximity to the interior surface of the inner wall of the outer chamber. That position allows the water flowing inwardly through the inlet of the outer chamber, due to its alignment with the inlet opening of the inner chamber, to pass from the inlet of the outer chamber into the inner chamber through the inlet opening in the inner chamber so as to strike the interior surface of the cylindrical shaped inner chamber at a tangent to that interior cylindrical surface thereby forming a vortex action where the water swirls in one direction around the interior surface of the inner chamber and turbulence is eliminated.

In addition, with the use of a single baffle plate that is located at or adjacent to the outlet in the outer chamber, as well as the offsetting of the inner chamber with respect to the center of the outer chamber, there is sufficient space within the separation tank so as to allow a person to enter the separation tank in order to affix the various components in their desired location therein.

These and other features of the present invention will become apparent upon review of the following detailed description of the present embodiments of the separation tank, when taken in conjunction with the drawings and the appended claims.

DETAILED DESCRIPTION OF THE INVENTION

Figure 1:
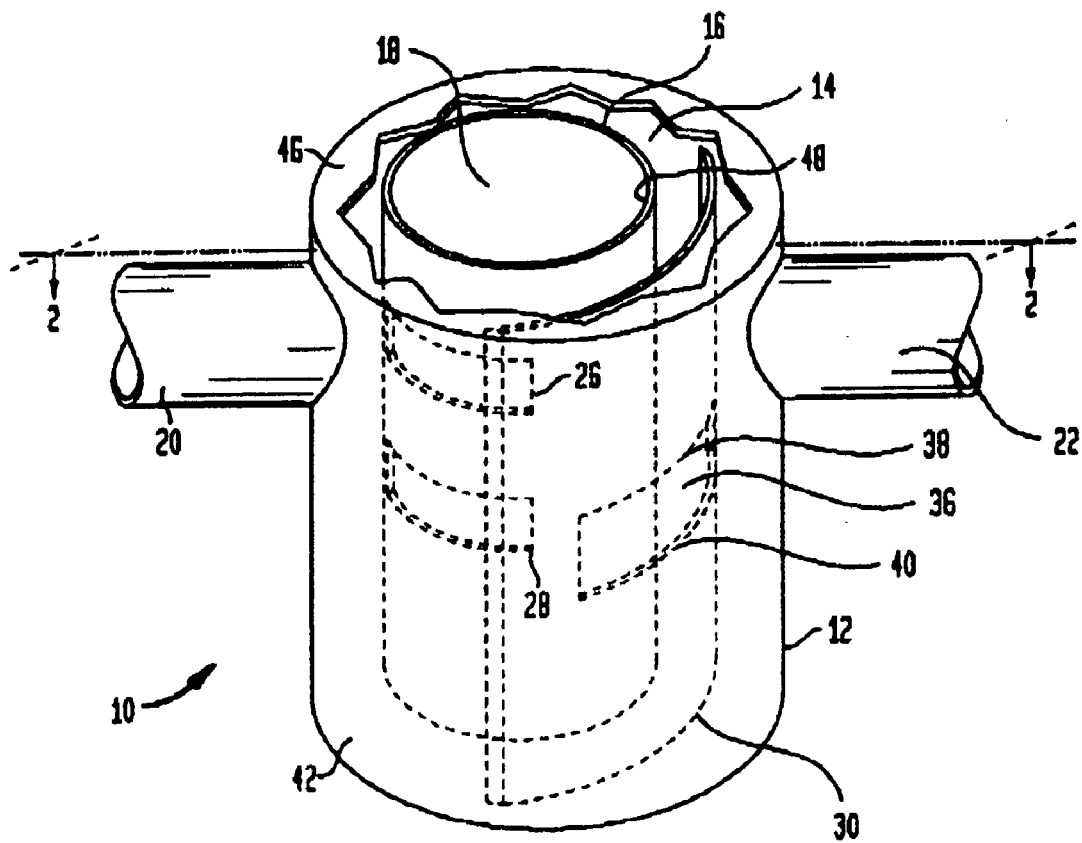
FIG. 1 is a perspective view, partially cut away, showing the separation tank of the present invention.
Figure 2:
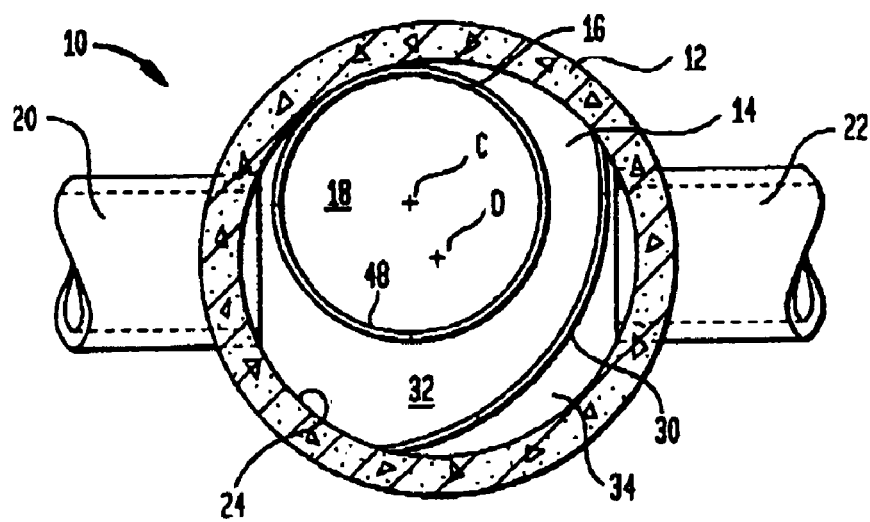
FIG. 2 is a top cross-sectional view taken along the lines 2—2 of FIG. 1.

Referring now to FIGS. 1 and 2, there is shown a separation tank 10 constructed in accordance with the present invention. The separation tank 10 may be constructed of an outer chamber wall 12 and forms an outer chamber 14 and, likewise, there is an inner chamber wall 16 forming an inner chamber 18. In both cases, the outer chamber and inner chamber walls 12, 16 may be cylindrical walls and the outer chamber wall 12 and inner chamber wall 16 can be constructed of a pre-cast concrete, fiberglass, plastic steel or similar types of material, it not being essential to the invention as to the particular material.

An inlet 20 is formed in the outer chamber wall 12 that is adapted to receive the flowing water to be treated. As will be seen the vertical location of the inlet 20 on the outer chamber wall 12 is significant and is a predetermined vertical location. The inlet 20 may be constructed with any piping materials commonly known in the art, e.g., concrete, aluminum, steel, PVC, HDPE, or other like materials and can be sealed to the outer chamber wall 12 by methods commonly known in the art, including the use of rubber boots, concrete grout, or similar types of materials or methods. Preferably the inlet 20 is a pipe or a similar structure with a diameter in the range of about 12 to 60 inches, although the particular sizing is not essential.

An outlet 22 is also formed in the outer chamber wall 12 and which is adapted to discharge the water from the separation tank 10 after that water has been treated and, again, the vertical position of the outlet 22 on the separation tank 10 is of importance to the present invention. Preferably, the outlet 22 is a pipe with a diameter in the range of about 12 to 60 inches, although the particular sizing is not essential, however, the outlet 22 generally may be the same size or larger than the inlet 20. The outlet 22 may make a watertight connection with the outer chamber wall 12 as the outlet 22 exits the separation tank 10. As described above, rubber boots, concrete grout, or similar types of materials or methods can be used to seal the outlet 22 to the outer chamber wall 12.

In the present embodiment of separation tank 10, the outer chamber 14 may have a volume in the range of about 100 to 1800 cubic feet with an overall diameter of about 4 to 12 feet and a height of about 8 to 16 feet. The dimensions of the inner chamber 18 are smaller than that of the outer chamber 14 such that the inner chamber 18 may fit inside of the outer chamber 14 as is shown in FIGS. 1 and 2. Preferably the inner chamber 18 may have a volume in the range of about 40 to 800 cubic feet with an overall diameter of about 3 to 8 feet and a height of about 8 to 12 feet.

With the inner chamber 18 and outer chamber 14 having similar shapes in the present embodiment, that is, cylindrical, as discussed above, the center C of the inner chamber 18 can be seen, particularly in FIG. 2, to be displaced away, that is, radially outwardly, from the center D of the outer chamber 14. Accordingly the inner chamber wall 16 can actual touch the interior surface 24 of the outer chamber wall 12 or at least be in close proximity thereto.

The position of the inner chamber 18 is predetermined with respect to the location of the inlet 20 and includes an inlet opening 26 that is formed in the inner chamber wall 16 at a predetermined vertical height in that inner chamber wall 16.

There is also an outlet opening 28 formed in the inner chamber wall 16 and which is located vertically lower with respect to that inlet opening 26. Both the inlet opening 26 and the outlet opening 28 can be rectangular in shape with a major horizontal longitudinal axis.

A baffle plate 30 is located within the separation tank 10 and, as shown, the baffle plate 30 is an arcuate plate that extends from one point along the interior surface 24 of the outer chamber wall 12 to another point along that interior surface and effectively creates an intermediate chamber 32 within the separation tank 10 and within the outer chamber 14 between the inner chamber wall 16 and the baffle plate 30. A further chamber, that is, an outlet chamber 34 is formed between the baffle plate 30 and an area within the interior surface 24 of the outer chamber wall 12 and which outlet chamber leads into the outlet 22. As such, the outer chamber 14 is subdivided, for purposes of the present description into subchambers comprising intermediate chamber 32 and outlet chamber 34.

There is a baffle opening 36 formed in the baffle plate 30 and is preferably a rectangular configuration such that there is an upper edge creating an upper weir 38 and a lower edge creating a lower weir 40. Again, the vertical location of the baffle opening 36 is a predetermined position with respect to the separation tank 10 as well as to the inlet 20 and the inlet and outlet openings 26, 28 and outlet 22.

Both the inner chamber wall 16 and the outer chamber wall 12 may rest on a floor 42. The floor 42 may be a circular piece of rigid material, e.g., precast concrete, poured in place concrete, or similar types of materials. The selection of the materials is not essential. The floor 42 may make watertight connections with both the outer chamber wall 12 and the inner chamber wall 16 per methods common in the art. As described above, rubber gaskets, neoprene gaskets, nitrile gaskets, or similar types of materials or methods may be used. The floor 42 may be sized such that its diameter is about the same as the diameter of the cylinder formed by the outer chamber wall 12.

The top of the outer chamber wall 12 may be left open or bound by a cover 46. The cover 46 can include a circular piece of a rigid material, i.e., precast concrete, stainless steel, aluminum, or other similar material. The selection of the material is not essential. The diameter of the cover 46 is preferably the same as the outer chamber 14 such that a substantially tight seal may be formed between the cover 46 and the outer chamber wall 12. The cover 46 may include a single or multiple access openings (not shown) in order to allow the entry of a person to initially assemble and install the separation tank 10 and to carry out maintenance procedures, including the removal of debris that will settle in the bottom of the separation tank 10 from time to time.

Figure 3:
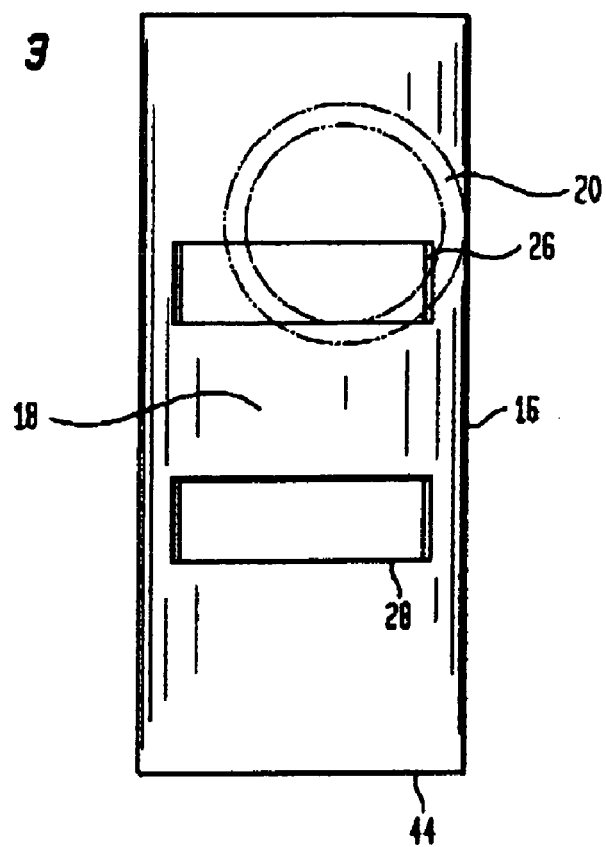
FIG. 3 is front view of the inner chamber of the present invention.

Turning now to FIG. 3, there is shown a side view of the inner chamber wall 16 that creates the inner chamber 18. As can be seen, the inlet 20, shown in phantom, is basically horizontally aligned with the inlet opening 26 such the water entering the separation tank 10 (FIG. 1) through the inlet 20 will continue flowing naturally so as to enter the inner chamber 18 through the inlet opening 26. As can be seen, the vertical position of the inlet opening 26 is about two thirds of the total height of the inlet chamber 18 off of the lower edge 44 of the inner chamber wall 16, however, the actual location and size of the inlet opening 26 may vary widely depending on the location and size of the inlet 20 and outlet 22.

The outlet opening 28 is also shown to be about one third of the height of the inlet chamber wall upwardly from the lower edge 44 of the inner chamber wall 16 however, again, the actual location of outlet opening 28 may vary depending on the inlet 20 and the outlet 22 as long as the outlet opening 28 is located below the inlet opening 26 but above the lower edge 44 of the inner chamber wall 16.

Figure 4:
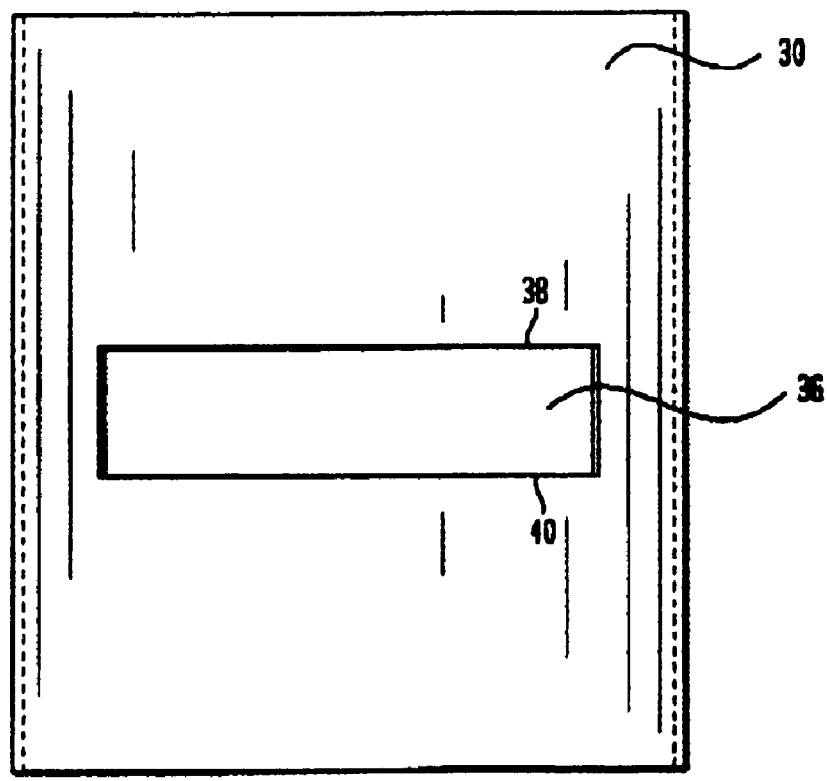
FIG. 4 is front view of the baffle plate used with the present invention.

Turning finally to FIG. 4, there is shown a front view of the baffle plate 30 of the present invention and illustrating the baffle opening 36 that creates the upper weir 38 and the lower weir 40. As also can be seen, the vertical location of the baffle opening 36 is at or slightly lower than the mid point of the vertical height of the baffle plate 30 and is located vertically higher than the outlet opening 28 but lower that the inlet opening 26 and lower than the vertical location of the outlet 22 (FIGS. 1 and 2), however, the width and vertical position of the baffle opening 36 can vary while still being within the spirit and intent of the present invention.

Accordingly, the operation of the separation tank 10 can now be described. The flow of the water to be treated enters the separation tank 10 by means of the inlet 20 and, at normal, or low flows, the water passes through inlet 20 whereupon it enters the inner chamber 18 through the inlet opening 26. As such, the water hits the interior surface 48 of the inner chamber wall 16 along a tangent to the cylindrical configuration such that the water flows in a vortex smoothly around the interior surface 48 of the inner chamber wall 16 where it gradually moves downwardly by gravity until it passes out of the inner chamber 18 through the outlet opening 28 and enters the intermediate chamber 32.

During its passage around the inner chamber 18, the solids drop to the bottom of the inner chamber 18 to be collected therein and, since the outlet opening 28 is located a predetermined vertical distance above the bottom of the inner chamber, those solids and non-floating particulate matter remain and collect in the bottom of the inner chamber 18 where those solids can be periodically cleaned out in the course of normal maintenance.

The water passing out of the outlet opening 28 then passes through the intermediate chamber 32 and thereafter passes though the baffle opening 36 into the outlet chamber 34 and then is discharged out of the separation tank 10 through the outlet 22. When the treated water passes through the baffle opening 36, however, floating materials such as oil are prevented from passing through the baffle opening 36 by means of the upper weir 38 that blocks the floating material from passing through the baffle opening 36 since the level of the water in the separation tank 10 is designed to be higher than the level of the upper weir 38 and the baffle opening 36 is designed to be lower than the outlet 22. Likewise, the non floating particulate material heavier solids are prevent by the lower weir 40 from passing through the baffle opening 36 and therefore are also effectively prevented from being discharged through the outlet 22. Non-floating particulate matter of any size may be filtered in this manner.

In the event of a high flow during a heavy storm, the high flow of water does not enter the inner chamber 18 since that additional flow is too much flow to enter the relatively restricted inlet opening 26 in the inner chamber 18 and thus the high flow is diverted away from the inner chamber 18 and flows instead directly into the intermediate chamber 32 generally at a tangent to the interior surface of the outer chamber wall 12 where it thereafter proceeds directly to the baffle opening 36 in the baffle plate 30.

Thus, the high flow, since it does not enter the inner chamber 18, does not stir up or purge the solids or non-floatable material that have collected at the bottom of the inner chamber 18. On the other hand, since that high flow must pass through the baffle opening 36 and therefore, under the upper weir 38 and over the lower weir 40, that water still has the floatable and non-floatable materials removed from the high flow stream of water by the time that stream is discharged through the outlet 22.

As can therefore, be seen, any floating particulate matter in the storm water can be trapped within the separation tank 10. Upon entering the separation tank 10, floating particulate matter is directed into the inner chamber 18 or during high flow the outer chamber 14, as discussed above, and remains in the inner chamber 18 or the outer chamber 14. In the inner chamber 18, i.e. at low flows, the floating particulate matter remains near the surface of the water and is unable to exit the inner chamber 18 because outlet opening 28 is positioned at, or near, the bottom of the inner chamber 18. At high flows, any floating particulate matter in the outer chamber 14 is blocked from the outlet 22 by the upper weir 38.

On the other hand, any non-floating particulate matter that enters the separation tank 10 during the periods of low flow is trapped at the bottom of the inner chamber 18 since it cannot leave the inner chamber 18 due to the location of the outlet opening 28 that is spaced above the bottom of that inner chamber 18 while, at high flows the non-floating particulate matter is trapped at the floor 42 of the intermediate chamber 32 since it is unable to pass through the baffle opening 36 in the baffle plate 30 such that the non-floating particular matter is trapped in the separation tank 10 at both the high and low flows.

Any obstruction in the inner chamber 18 or in the inlet opening 26 will not prohibit water flow through the separation tank 10 since the water will flow directly into the outer chamber 14 and flow under the upper weir 38 and over the lower weir 40.

The inlet 20 and the outlet 22 may be positioned at the same or a similar height from the floor 42 of about 4 to 8 feet, although this measurement may increase or decrease depending on the size and usage of the separation tank 10 as a whole. Preferably, the inlet 20 may be 1–3 inches higher than the outlet 22.

Those skilled in the art will readily recognize numerous adaptations and modifications which can be made to the water separation tank of the present invention which will result in an improved water treatment system, yet all of which will fall within the scope and spirit of the present invention as defined in the following claims. Accordingly, the invention is to be limited only by the following claims and their equivalents.

I claim:

1. A system for removing floating and non-floating particulate material from a stream of water, said system comprising:
    a separation tank for treating a flowing stream of water, said separation tank comprising an outer chamber having an interior surface having a first center, an inner chamber having an interior surface having a second center positioned within said outer chamber, the first center being displaced away from the second center, an inlet in said outer chamber adapted to receive the water to be treated, an outlet in said outer chamber adapted to discharge the treated water, said inner chamber having an inlet opening and an outlet opening; said inlet opening being aligned with said inlet whereby water entering said inlet passes through said inlet opening in a generally straight path to enter said inner chamber to strike the interior surface of the inner chamber generally at a tangent to the interior surface of said inner chamber and passes out of said inner chamber through said outlet opening to enter said outer chamber, and a baffle plate located intermediate said outlet opening in said inner chamber and said outlet in said outer chamber, said baffle plate having a baffle opening formed therein such that water passes to said outlet in said outer chamber through said baffle opening, said baffle opening being located at a predetermined vertical location within said separation tank, said inlet opening being sized to allow a maximum flow therethrough such that a high flow of water exceeding that maximum flow will be prevented from entering said inner chamber, said high flow of water thereafter being directed to pass through said baffle plate and to be discharged through said outlet in said outer chamber.

2. A separation tank for treating a flowing stream of water, said separation tank comprising:
    an outer chamber formed by an interior surface having a first center;
    an inner chamber having an interior surface having a second center positioned within said outer chamber; the first center being displaced away from the second center
    an inlet in said outer chamber adapted to receive the water to be treated;
    an outlet in said outer chamber adapted to discharge the treated water;
    said inner chamber having an inlet opening and an outlet opening;
    said inlet opening being aligned with said inlet to direct water entering said inlet to pass through said inlet opening in a generally straight path to enter said inner chamber to strike the interior surface of the inner chamber at a tangent thereto so as to create a vortex swirling action of the water along the interior surface of the inner chamber and to pass out of said inner chamber through said outlet opening, and
    a baffle plate located intermediate said outlet opening in said inner chamber and said outlet in said outer chamber, said baffle plate having an opening therethrough through which water passes to said outlet in said outer chamber, said baffle plate having a baffle opening formed therein at a predetermined vertical location within said separation tank.

3. The separation tank of claim 2 wherein said outer chamber is a cylindrical chamber having an interior cylindrical surface.

4. The separation tank of claim 3 wherein the water passing out of said outlet opening in said inner chamber moves generally at a tangent to the interior surface of said cylindrical outer chamber.

5. The separation tank of claim 3 wherein said baffle plate is an arcuate plate having opposite ends affixed to the interior cylindrical surface of said outer chamber.

6. The separation tank of claim 2 wherein said inner chamber is a cylindrical chamber having an interior cylindrical surface.

7. The separation tank of claim 6 wherein the water entering said inner chamber strikes the interior cylindrical surface at a tangent to the interior surface of said cylindrical inner chamber.

8. The separation tank of claim 2 wherein said separation tank has a floor and wherein said inner chamber and said outer chamber are positioned on said floor.

9. The separation tank of claim 8 wherein said outlet opening in said inner chamber is located below said inlet opening but above said floor.

10. The separation tank of claim 2 wherein said inlet in said outer chamber is generally horizontally aligned with said inlet opening in said inner chamber.

11. The separation tank of claim 2 wherein said inlet opening and said outlet opening are substantially rectangular shapes.

12. The separation tank of claim 2 wherein said baffle opening in said baffle plate is positioned below the vertical position of said outlet in said outer chamber.

13. The separation tank of claim 2 wherein said inner chamber is formed as a cylindrical wall and said outer chamber is formed as a cylindrical wall and wherein said cylindrical wall of said inner chamber is positioned so as to touch or be in close proximity to said cylindrical wall of said outer chamber.

14. A system for removing floating and non-floating particulate material from a stream of water, said system comprising:

a separation tank for treating a flowing stream of water, said separation tank comprising an outer chamber having an interior surface having a first center, an inner chamber having an interior surface having a second center positioned within said outer chamber, the first center being displaced away from the second center, an inlet in said outer chamber adapted to receive the water to be treated, an outlet in said outer chamber adapted to discharge the treated water, said inner chamber having an inlet opening and an outlet opening; said inlet opening being aligned with said inlet whereby water entering said inlet passes through said inlet opening in a generally straight path to enter said inner chamber generally at a tangent to the interior surface of said inner chamber and passes out of said inner chamber through said outlet opening to enter said outer chamber, and a baffle plate located intermediate said outlet opening in said inner chamber and said outlet in said outer chamber, said baffle plate having a baffle opening formed therein such that water passes to said outlet in said outer chamber through said baffle opening, said baffle opening being located at a predetermined vertical location within said separation tank, said inlet opening being sized to allow a maximum flow therethrough such that a high flow of water exceeding that maximum flow will be prevented from entering said inner chamber and will pass directly to said outer chamber to thereafter pass through said baffle opening in said baffle plate to said outlet.

15. The system as defined in claim 14 wherein said interior surface of said inner chamber is an arcuate surface.

16. The system as defined in claim 15 wherein said interior surface of said inner chamber is cylindrical.

17. The system of claim 14 wherein said interior surface of said outer chamber is an arcuate surface and said flow of water prevented from entering said inner chamber is directed at a tangent to the interior arcuate surface of said outer chamber.

18. The system of claim 17 wherein said arcuate surface is cylindrical.

19. The system of claim 14 wherein said baffle opening creates an upper weir and a lower weir to separate both floatable and non-floatable material from the flow of water discharged through said outlet.

20. The system of claim 14 wherein said baffle opening is located vertically below said outlet in said outer chamber.

21. The system of claim 20 wherein said baffle opening is located vertically above said outlet opening in said inner chamber.

22. A method of separating floatable and non-floatable material from a stream of water by means of a separation tank, said method comprising the steps of:

providing an outer chamber having an interior surface having a first center and having inlet adapted to receive a stream of water to be treated and an outlet for discharging treated water passing though the separation tank;

providing an inner chamber located within the outer chamber, the inner chamber having an interior surface having a second center displaced a distance away from the first center, an inlet opening and an outlet opening located vertically lower than the inlet opening;

directing the stream of water received by the inlet through the inlet opening in a generally straight path so as to contact the interior surface of the inner chamber to form a vortex swirling path around the inner chamber to progress downwardly to pass through the outlet opening;

passing the water from the outlet opening over and under a weir to trap floatable and non-floatable materials in the water;

discharging the water from said tank, through the outlet.

23. The method of claim 22 wherein the step of providing an inner chamber having an interior surface comprises providing an inner chamber having an arcuate interior surface.

24. The method of claim 23 wherein the step of providing an inner chamber having an interior surface comprises providing an inner chamber having a cylindrical interior surface.

25. The method of claim 22 wherein the step of passing the water over and under a weir comprises providing a baffle plate having a baffle opening located intermediate the inner chamber and the outlet forming upper and lower weirs.

26. The method of claim 25 wherein the step of providing a baffle plate comprises providing an arcuate baffle plate affixed to the interior surface of the outer chamber to isolate the outlet such that all of the water passes through the baffle opening before reaching the outlet.

27. The method of claim 22 wherein the step of directing the steam of water further comprises separating out non-floatable materials from the stream of water passing through the inner chamber and collecting those materials at the bottom of the inner chamber.

* * * * *